(12) United States Patent
Launius, Jr.

(10) Patent No.: US 8,713,812 B2
(45) Date of Patent: May 6, 2014

(54) AXLE GUIDE

(76) Inventor: William E. Launius, Jr., Millstadt, IL (US)

( * ) Notice: Subject to any disclaimer, the term of this patent is extended or adjusted under 35 U.S.C. 154(b) by 228 days.

(21) Appl. No.: 13/430,426

(22) Filed: Mar. 26, 2012

(65) Prior Publication Data

US 2013/0247397 A1    Sep. 26, 2013

(51) Int. Cl.
*G01B 3/14* (2006.01)
(52) U.S. Cl.
USPC .............................. 33/613; 33/562; 33/193
(58) Field of Classification Search
USPC .......... 33/613, 1 BB, 501.05, 501.06, 501.08, 33/501.09, 501.45, 562, 567, 193
See application file for complete search history.

(56) References Cited

U.S. PATENT DOCUMENTS

| | | | | |
|---|---|---|---|---|
| 2,498,171 A | * | 2/1950 | Michler | 33/562 |
| 3,063,153 A | * | 11/1962 | Stites | 33/602 |
| 3,287,813 A | * | 11/1966 | Lennon et al. | 33/562 |
| 6,904,694 B2 | * | 6/2005 | Launius, Jr. | 33/562 |
| 7,735,232 B2 | * | 6/2010 | Bahler | 33/518 |
| 7,913,413 B2 | * | 3/2011 | McHowell | 33/613 |
| 8,286,362 B2 | * | 10/2012 | Petersheim | 33/613 |
| 8,601,705 B2 | * | 12/2013 | Bierman | 33/613 |
| 2006/0225296 A1 | * | 10/2006 | Schulte | 33/501.06 |
| 2007/0238390 A1 | * | 10/2007 | Kelderhouse et al. | 446/469 |
| 2008/0010846 A1 | * | 1/2008 | Bingham | 33/613 |

* cited by examiner

*Primary Examiner* — Christopher Fulton
(74) *Attorney, Agent, or Firm* — Charles McCloskey

(57) ABSTRACT

The axle guide has a generally rectangular base having a thickness, a top surface, and an opposite bottom surface, a first end and an opposite second end, and a right side and an opposite left side. The top surface has a lengthwise spine with less height than the thickness of the base. The first end has a threaded aperture receiving a screw which secures a planar gauge. The gauge has its own thickness, generally that of the desired gap between a wheel hub and the car body. The gauge has a generally slotted shape secured by the screw to the first end. The gauge is preferably H shaped or alternately C shaped. The slot of the gauge receives the shaft of an axle.

8 Claims, 4 Drawing Sheets

AXLE GUIDE

BACKGROUND OF THE INVENTION

The present invention relates to manual tools for scale wooden models of cars and has particular utility in connection with installing axles parallel to the bottom of a wooden model car body and wheels at a predetermined distance from a wooden model car body.

As winter loosens its grip, Cub Scouts emerge from dens across the land for a contest: the PINEWOOD DERBY® wooden model car race. For the PINEWOOD DERBY® race, Cub Scouts and their adult sponsors assemble a wooden car from a kit in the days and weeks before a race and then race their cars against those of fellow Cub Scouts upon a track with guideways for each car. Cub Scouts that win local races advance to tournaments at higher and higher levels. In a car race, speed remains essential to victory and thousandths of a second count dearly to Cub Scouts and their sponsors. So, Cub Scouts and sponsors seek to minimize wheel friction and to align wheels precisely. The wooden cars have four polymer, or plastic, wheels. Each plastic wheel has a finished face, a rim, and a centered hub opposite the finished face. The hub fits over an axle hammered into the car. Spinning upon the axle, the hub contacts the car while the rim rolls upon the track.

Unique aspects of the present invention are positioning an axle horizontally and positioning an axle a predetermined distance beneath a car body while the axle rests in a kerf in the car body and at the same time spacing a wheel outwardly from the car body a second predetermined distance. The two distances meet the regulations of the race while positioning an axle and a wheel precisely to reduce friction caused by misalignment of wheels to the racetrack. The present invention is used for each axle of the vehicle so that all of them have locations the same distance from the car body. Prior art designs positioned axles and wheels by visual and tactile observation alone. Cub Scouts and their sponsors place the wheel upon an axle and then press the axle into the kerf. The vagaries of the wood from the kerf often placed axles, and thus wheels, out of position and alignment resulting in skewed placement upon the racetrack and a loss of speed.

The present invention overcomes the limitations of the prior art. The difficulty in positioning axles and wheels in relation to a car body by Cub Scouts with minimal skill is shown by the operation of the typical method. From the factory and handling, car bodies have a generally rectangular cross section with a bottom face having two saw cuts, or kerfs, across the bottom face. The kerfs receive a regulation axle. However, a kerf has the wood remnants from the saw. The remnants include blade tip marks, chad, dust, and stray shavings of wood, or fuzz. A Cub Scout puts the pointed tip of the axle through the hub of the wheel until the head of the axle abuts the surface of the finished wheel face. The Cub Scout then places the axle upon the kerf and the wheel just outside the car body. The Cub Scout then uses his thumbs and fingers to press the axle into the kerf and the hub of the wheel abuts the car body. However, an axle advances only so far into a kerf using finger pressure. A Cub Scout or sponsor may further insert the axle using a thin tool such as a screwdriver. Applying pressure to just a portion of the axle, the axle often skews and one end moves more into the kerf than the other. A skewed axle then shifts the angle of the rim to the track and may also cause the wheel to rub against the car body. These results from a skewed axle cause partial contact of the wheel with the track and the guideway, increasing friction, altering the path of car travel, and reducing the speed of the car. The present invention overcomes these difficulties.

That is, the art of the present invention allows Cub Scouts and sponsors to push the entire length of an axle at one time into the kerf while spacing a wheel a certain distance from the car body. The axle guide has the desirable function of positioning a wheel hub at a known distance from the car body and parallel to the track thus reducing friction between a wheel and a car body and the wheel and the track. The axle guide also provides for a more precise and square orientation of a rim to the track.

DESCRIPTION OF THE PRIOR ART

Devices for accurate axle placement in a car body have appeared in the prior art. The U.S. Pat. No. 6,904,694 of the Applicant provides a tool that supports drill bits for precisely locating and making holes in a car body. The holes then receive axles inserted into them. However, the holes do not affect the distance of a wheel from the car body.

While the above-described device fulfills its respective, particular objectives and requirements, the aforementioned patent does not describe an axle guide that sets an axle in a kerf horizontally and spaces a wheel from a car body.

Therefore, a need exists for a new and improved axle guide that the present invention substantially fulfills. The axle guide according to the present invention substantially departs from the conventional concepts and designs of the prior art, and in doing so provides a device primarily developed for the purpose of positioning axles in kerfs and wheels a certain distance from a car body by children using hand tools with limited adult supervision.

SUMMARY OF THE INVENTION

In view of the foregoing disadvantages inherent in the prior art, the present invention provides an improved axle guide and overcomes the above-mentioned disadvantages and drawbacks of the prior art. As such, the general purpose of the present invention, which will be described subsequently in greater detail, is to provide a new and improved axle guide which has all of the advantages of the prior art mentioned heretofore and many novel features that result in an axle guide which is not anticipated, rendered obvious, suggested, or even implied by the prior art, either alone or in any combination thereof.

To attain this, the present invention essentially comprises a generally rectangular base having a thickness, a top surface, and an opposite bottom surface, a first end and an opposite second end. The top surface has a spine extending lengthwise and the spine has much less height than the thickness of the base. The first end has a threaded aperture that receives a threaded screw which secures a gauge to the first end. The gauge has its own thickness, generally that of the desired spacing between a wheel hub and the car body. The gauge has a generally slotted shape secured by the screw to the first end. The slot of the gauge receives the shaft of an axle.

There has thus been outlined, rather broadly, the more important features of the invention in order that the detailed description thereof that follows may be better understood and in order that the present contribution to the art may be better appreciated.

The invention may also include a gauge having a C shape or an H shape, a lengthwise, or longitudinal, spine having a 1/16 inch height in comparison to a 7/16 inch thickness of the base, the threaded aperture centering upon the first end, and the spine being beveled proximate the first and second ends.

Additional features of the invention will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. Before explaining the current embodiment of the invention in detail, the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved axle guide that has all of the advantages of the prior art and none of the disadvantages.

It is another object of the present invention to provide a new and improved axle guide that may be easily and efficiently manufactured and marketed.

It is another object of the present invention to provide a new and improved axle guide that has a low cost of manufacture with regard to both materials and labor, and which accordingly is then susceptible of low prices of sale to the consuming public, thereby making such axle guide economically available to the Cub Scouts and their sponsors.

It is another object of the present invention to provide an axle guide for installing axles flat, or horizontally, in a kerf. A flat axle precisely positions a rotating wheel for a flat fit of the wheel rim to the track and reducing friction which increases the speed of the car.

It is another object of the present invention to provide an axle guide for straightening axles that makes it possible for a Cub Scout to install an axle without a power tool.

It is another object of the present invention to provide an axle guide for straightening axles so that a Cub Scout can install an axle with minimal risk of injury and less adult supervision.

It is another object of the present invention to provide an axle guide for straightening axles so that a Cub Scout can set the wheel to body gap at the same distance for all wheels of a model car.

It is another object of the present invention to provide an axle guide for straightening axles to ensure accurate mounting of axles in the axle slots thus improving wheel alignment and raising the speed of the model car.

It is another object of the present invention to provide an axle guide for straightening axles to set a correct gap between the hub of a wheel upon an axle and the car body where a correct gap minimizes wandering of the model car thus reducing excessive contacting between a wheel hub and a car body.

And, it is another object of the present invention to provide an axle guide for straightening axles to support the wood of a car body proximate an axle slot thus reducing splintering and other damage to the car body.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
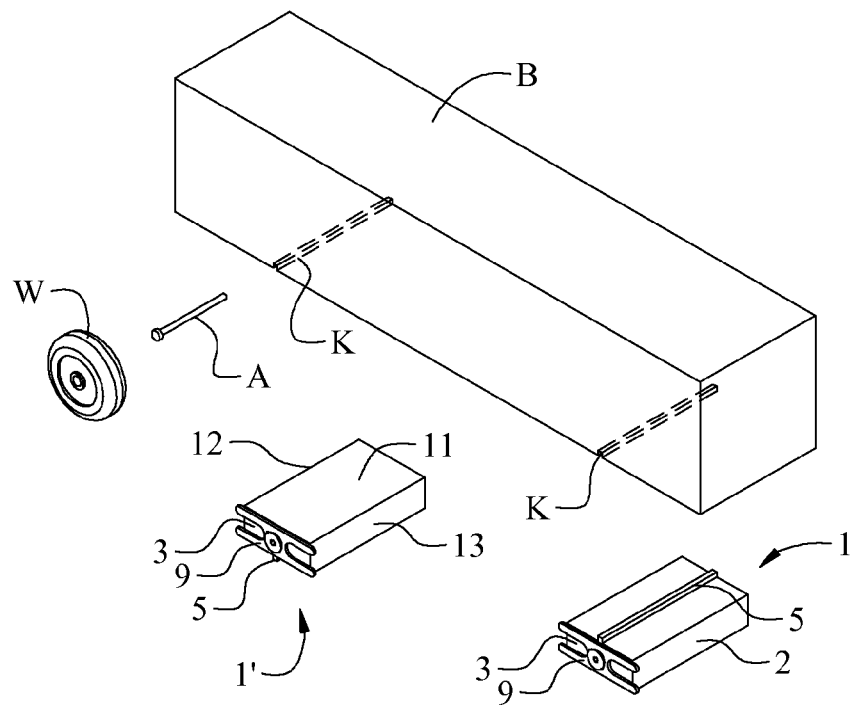
FIG. 1 shows a perspective view of the axle guide of the present invention proximate a model car body, axle, and wheel and an alternate position of the guide as at 1'.

Referring now to the drawings, and particularly to FIGS. 1-8, an axle guide of the present invention is shown and generally designated by the reference numeral 1. The present invention overcomes the prior art limitations in positioning an axle flat and a wheel at a proper offset from a wooden model car body, such as PINEWOOD DERBY®, by a Cub Scout with minimal risk of injury. The present invention comes from a machined block of material and a laser cut tab, or gauge, that fits into the axle slot of most wooden model car bodies. The gauge precisely spaces the wheels outwardly from the body during assembly or later during an alignment. The block of the invention also sees use inverted when applied to extended wheel base cars. The present invention increases the speed of a model car through accurate mounting of axles through three ways. First, the present invention improves axle insertion by accurate mounting of an axle in an axle slot leading to precise alignment, critical for higher speeds. Second, the present invention sets the correct wheel to body spacing by establishing the correct gap between a wheel's hub and the wooden model car body. A proper gap minimizes car wander, that is, side to side movement, and reduces excess contact between the model car and the wheel hub, that is, opportunities for friction to slow wheel rotation during a race. And third, the present invention lessens the risk of block damage, that is, splintering of a wooden model car body during axle insertion. The invention provides support to the wood of the model car at the edges of the kerf of a slot, as a Cub Scout inserts an axle.

In FIG. 1, a model car body B has its own bottom surface that has two kerfs K cut into it at a factory. The kerfs are generally rough slots that have frayed ends of wood fibers extending into the slot from the saw teeth that made the kerf. Each kerf has sufficient width to admit an axle A in a snug fit. However, the rough texture and depth of the kerf lead to axles installed askew by unskilled Cub Scouts. An axle out of alignment causes a wheel W, upon the axle, to rotate about an axis not quite parallel to the track of the car and not quite perpendicular to the direction of motion. An askew wheel then urges the model car off a straight path and one or more wheels of the car engage the guideway of the track. The friction from hitting or scraping along the guideway slows a car enough to escape a ribbon winning performance. The present invention 1 has a generally rectangular base 2 having its length approximately that of the width of a model car body B. The base has a first end 3, here shown as rectangular and towards the left in the figure. Perpendicular to the first end, the base has a spine 5 that extends for the length of the base. The spine of the base fits snugly into a kerf while the remainder of the base abuts the bottom of the model car body. The spine allows a Cub Scout to set an axle at a known height upward from the bottom of the model car body and at a generally flat orientation, that is, parallel to the bottom of the car body as at 4 and to the track when the model car races. Alternatively, the invention may see use inverted as at 1' in FIG. 1. When inverted, the invention 1' presents a flat bottom 11 to the underside of the car body, especially an extended wheel base model car. The flat bottom supports the car body during insertion of an axle at a location away from any pre-cut kerf.

Figure 2:
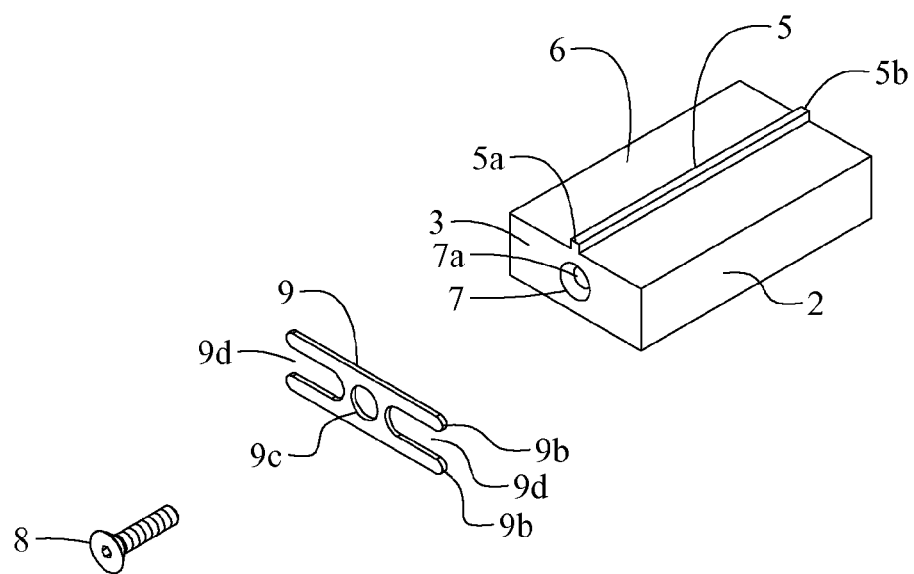
FIG. 2 shows an exploded view of the present invention.

Looking more closely at the invention, FIG. 2 shows the components of the invention when separated. The base 2 has its first end 3 and an opposite second end 4. The second end is generally parallel to the first end and spaced away. Perpendicular to the first end and the second end, the base has a top surface 6 that abuts the bottom of a model car body during usage. The top surface is generally rectangular. The spine 5 extends outwardly from the top surface, for the length of the base 2, and generally centered upon the base from the first end to the second end. The spine has a height much less than the thickness of the base, such as a $\frac{1}{16}$ inch spine height and $\frac{7}{16}$ base thickness.

The first end has a centered, threaded aperture 7 therein. The aperture is generally below the top surface and the spine. In an alternate embodiment, the aperture has a countersink as at 7a. The aperture receives a screw 8 in a threaded engagement. The screw secures a planar gauge 9 to the first end at a variety of positions though having two primary positions, a shipping position where the gauge is generally parallel to the top surface and a use position where the gauge is generally perpendicular to the top surface. The gauge has a planar form of a narrow H shape where a cross arm 9a joins two spaced apart uprights 9b. The uprights are mutually parallel and spaced apart with a length greater than the length of the cross arm. The spacing of the uprights forms a gap as at 9d that admits an axle during usage. The uprights have generally rounded corners. Meanwhile, the cross arm occupies the center of the gauge and has its own centered hole 9c that admits the screw when securing the gauge to the base.

Figure 3:
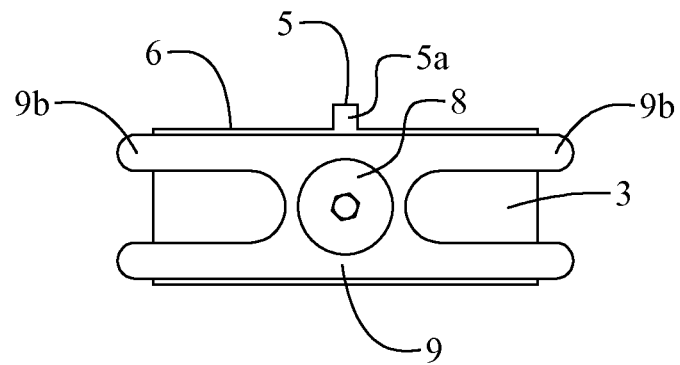
FIG. 3 shows a front view of the present invention.

FIG. 3 shows an end view of the first end 3 with the gauge 9 generally parallel to the top surface 6, as in its shipping position. The gauge secures to the first end using the screw 8 inserted into the centered aperture. The screw and the gauge are generally centered beneath the spine 5. The gauge has a width slightly less than the thickness 10 of the base. With the gauge positioned as shown in FIG. 3, the present invention has a compact form for shipping by common carrier. This position puts the least amount of the gauge uprights 9b at risk for bending or other damage en route to a user.

Figure 4:
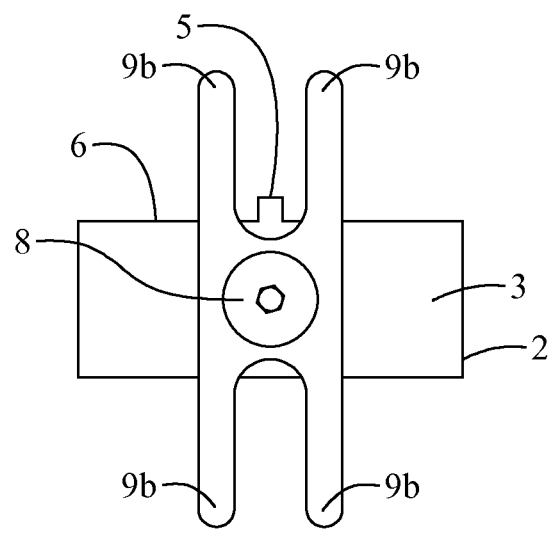
FIG. 4 shows a front view with the gauge positioned for usage.

Once unpacked and ready for use, the device has the gauge so that the gauge 9 is positioned generally perpendicular to the top surface 6 as shown in FIG. 4, as in the use position. Loosening the screw 8 from the aperture 7 allows for rotation of the gauge about an axis parallel to the length of the base 2. The uprights 9b are generally perpendicular to the top surface 6 and centered about the spine 5. The length of the gauge allows the uprights to extend above the top surface 6 at least twice the height of the spine to accommodate axles and wheels of larger diameters.

Figure 5:
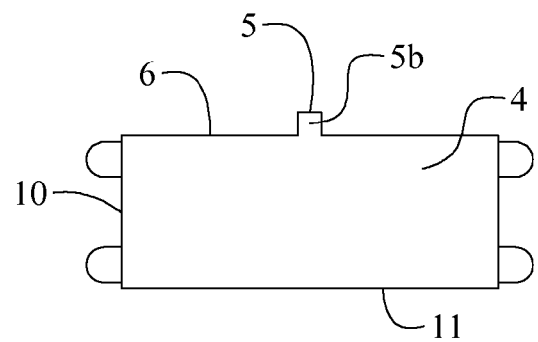
FIG. 5 describes a rear view of the present invention.

Opposite the gauge 9 on the first end 3, the base has its second end 4 illustrated in FIG. 5. The base has the top surface 6 and an opposite bottom surface 11. The top surface contains the spine 5 and adjoins a car body while the bottom surface locates away from the spine and the car body when the use position. The top surface and the bottom surface are generally mutually parallel and spaced apart by a thickness 10 of the body. The thickness is sufficient to aid a user, such as a Cub Scout, in gripping the device and to provide rigidity to the spine, while minimizing material cost and packaging difficulties. The spine is generally $\frac{1}{7}^{th}$, or 14%, of the thickness 10 of the base. As shown, the base generally has a rectangular cross section with the spine centered upon one elongated surface and extending lengthwise upon that surface, here the top surface 6.

Figure 6:
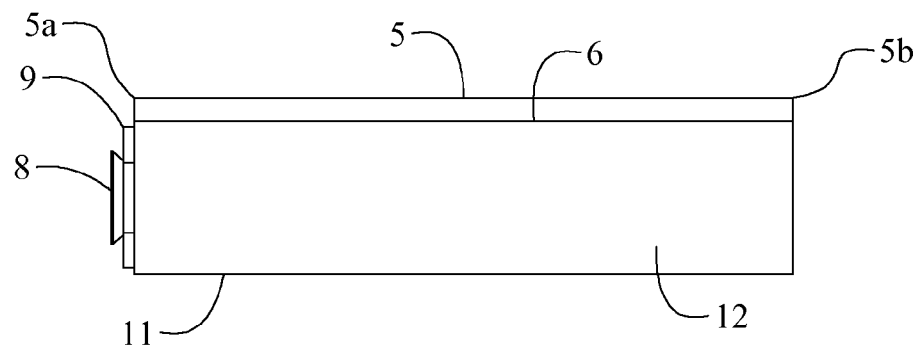
FIG. 6 illustrates a side view of the present invention.
Figure 7:
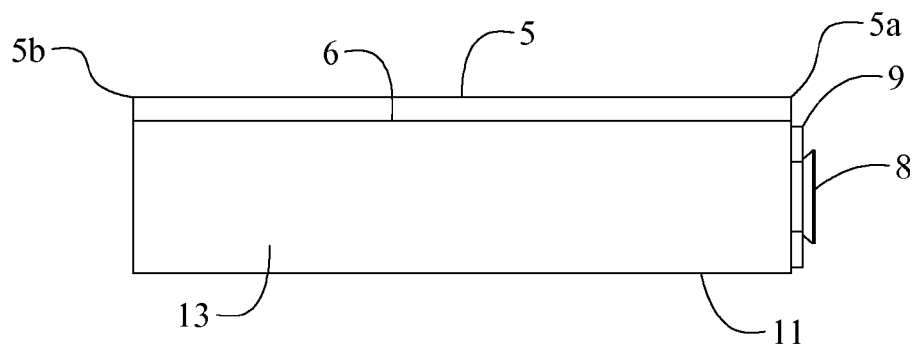
FIG. 7 provides an opposite side view.

FIG. 6 shows a side view of the invention with the gauge 9 towards the left of the figure. The base 2 is generally elongated with the gauge 9 upon the first end 3 and a flush second end 4 opposite the first end. A screw 8 secures the gauge 9 to the first end 3 here shown in the shipping position where the uprights 9b of the gauge are generally parallel to the top surface. Spanning from the first end to the second end, the base has the top surface 6 that has the spine 5 extending lengthwise. The spine generally has ends, as at 5a, 5b, flush with the first end and the second end respectively. Spanning from the top surface to the bottom surface and from the first end to the second end outwardly from the centered aperture, the base has a right side 12. The right side has a generally rectangular shape with a height that of the thickness 10 of the base. Opposite the right side, the base has the left side 13 as shown in FIG. 7. The left side is mutually parallel and spaced apart from the right side and has a similar shape as the right side.

Figure 8:
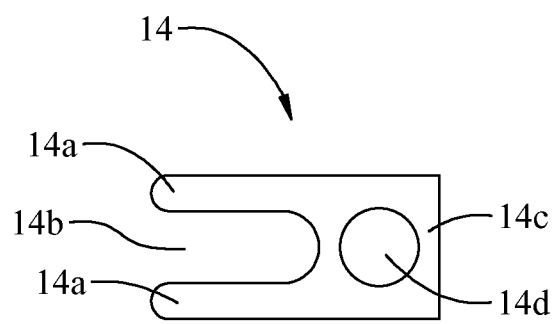
FIG. 8 shows an alternate embodiment of the gauge.

Previously, the gauge was described as having an H shape. FIG. 8 shows an alternate embodiment of the gauge having a C shape, as at 14. This embodiment has two uprights, as at 14a, mutually parallel and spaced apart that have a gap 14b between them. The uprights join to a cross arm 14c forming the closed end of the C shape. The cross arm includes a centered hole 14d that admits the screw for securement of the gauge in the shipping position or use position as needed. This alternate gauge is generally planar and of thin cross section. The gauge has a width across the uprights and the gap slightly less than the thickness of the base. The alternate gauge has a length slightly more than half of the width of the base, that is, from left side to right side. As shown, the cross arms have square corners opposite the uprights however, rounded corners are also foreseen.

To use the preferred embodiment, a Cub Scout sets the axle through a hub in a wheel, tip first, and then the axle A into a kerf K tip first. The Cub Scout then loosens the screw 8 and turns the gauge 9 so that the uprights are centered upon the spin, such as shown in FIG. 4. The Cub Scout then presses the spine 5 upon the axle and into the kerf until the top surface abuts the bottom of the model car body. The Cub Scout then pushes the axle into the kerf upon the spine until the hub of the wheel abuts the gauge. This method sets an axle straight, that is, parallel to the bottom of a model car body, so that it is perpendicular to the direction of travel of the model car and sets a wheel a predetermined distance from the car body to minimize friction from the wheel contacting the car body. In using the alternate embodiment of the gauge, a user loosens the screw and rotates the gauge so that the uprights are perpendicular to the top surface while the cross arm is away from the spine.

From the aforementioned description, an axle guide has been described, particularly one with a pivotal gauge. The axle guide is uniquely capable of setting axles straight into a saw kerf and setting the offset of a wheel hub from a model car body with minimal risk of injury to a user. The axle guide and its various components may be manufactured from many materials, including but not limited to, aluminum, steel, ferrous and non-ferrous metals, their alloys, select polymers, and composites.

As such, those skilled in the art will appreciate that the conception, upon which this disclosure is based, may readily be utilized as a basis for the designing of other structures, methods and systems for carrying out the several purposes of the present invention. Heretofore, those skilled in the art have not recognized a base with a spine and end mounted gauge for an axle guide that also sets the wheel offset. Therefore, the claims include such equivalent constructions insofar as they do not depart from the spirit and the scope of the present invention.

I claim:

1. A device to set a gap between a wheel and a body of a wooden model car and to guide an axle into a kerf of the body, comprising:
a base, generally rectangular and elongated, having a length, a thickness perpendicular to the length, two opposite ends, a top surface between said ends, a spine centered upon said top surface extending for the length of said base; and,
a gauge pivotally connecting to one of said ends, said gauge generally centered upon said end, said gauge having a shipping position wherein said gauge orients parallel to said top surface and a usage position wherein said gauge orients perpendicular to said top surface.

2. The gap setting device of claim 1 further comprising:
said base having a first end and an opposite second end, said second end being mutually parallel and spaced apart from said first end, a right side and an opposite left side, said left side being mutually parallel and spaced apart from said right side, said right side being perpendicular to said first end, a bottom surface mutually parallel to said top surface and spaced below said top surface; and,
said gauge pivotally connecting to said first end.

3. The gap setting device of claim 2 further comprising:
said first end having a centered threaded aperture, generally beneath said spine; and,
a screw connecting said gauge to said threaded aperture.

4. The gap setting device of claim 2 wherein said spine terminates flush with said first end and said second end.

5. The gap setting device of claim 4 wherein said spine has a height above said top surface approximately 14% of said thickness of said base.

6. The gap setting device of claim 1 further comprising:
said gauge being planar and thin and having a generally H like shape, two mutually parallel spaced apart uprights, a cross arm joining to said uprights generally in the center of said gauge, and a hole through said cross arm.

7. The gap setting device of claim 1 further comprising:
said gauge being planar and thin and having a generally C like shape, two mutually parallel spaced apart uprights, a cross arm joining offset to said uprights generally defining the center of said gauge, and a hole through said cross arm.

8. A device to set a gap between a wheel and a body of a wooden model car and to guide an axle into a kerf of the body, comprising:
a base, generally rectangular and elongated, having a length, a thickness perpendicular to the length, a first end and an opposite second end, said second end being mutually parallel and spaced apart from said first end, a right side and an opposite left side, said left side being mutually parallel and spaced apart from said right side, said right side being perpendicular to said first end, a top surface between said ends, a bottom surface mutually parallel to said top surface and spaced below said top surface, a spine centered upon said top surface extending for the length of said base;
a gauge pivotally connecting to said first end, said gauge generally centered upon said first end, said gauge having a shipping position wherein said gauge orients parallel to said top surface and a usage position wherein said gauge orients perpendicular to said top surface;
said gauge being thin and planar and having one of a H like shape or a C like shape, two mutually parallel spaced apart uprights, a cross arm joining to said uprights generally in the center of said gauge, and a hole through said cross arm;
said first end having a centered threaded aperture, generally beneath said spine;
a screw connecting said gauge to said threaded aperture;
said spine terminating flush with said first end and said second end; and,
said spine having a height above said top surface approximately 14% of said thickness of said base.

* * * * *